United States Patent [19]
Watanabe

[11] 3,819,916
[45] June 25, 1974

[54] METHOD FOR MONITORING MACHINING CONDITION OF A MACHINE TOOL

[75] Inventor: Toshiaki Watanabe, Kasugai, Japan

[73] Assignee: Okuma Machinery Works, Ltd., Nagaya-shi, Japan

[22] Filed: Oct. 20, 1972

[21] Appl. No.: 299,561

[30] Foreign Application Priority Data
Oct. 22, 1971 Japan................................ 46-84263

[52] U.S. Cl............. 235/151.11, 235/151.3, 73/104
[51] Int. Cl............................................ B23q 11/00
[58] Field of Search ...... 73/104; 235/151.3, 151.11; 90/13

[56] References Cited
UNITED STATES PATENTS
3,326,039  6/1967  Roberts................................ 73/104

Primary Examiner—Eugene G. Botz
Attorney, Agent, or Firm—Ladas, Parry, Von Gehr, Goldsmith & Deschamps

[57] ABSTRACT

In a machine tool having a work holder and a cutting tool which is brought into cutting engagement with a workpiece held on the work holder to machine the same, the reaction force on the cutting tool is detected in the form of three components, that is, a backing force component, a feeding force component and a main force component, to obtain ratios of one component to the other two components. The ratios are then compared with corresponding reference values to detect abnormal conditions of the cutting tool.

5 Claims, 8 Drawing Figures

3,819,916

METHOD FOR MONITORING MACHINING CONDITION OF A MACHINE TOOL

BACKGROUND OF THE INVENTION

The present invention relates to a machine tool and more particularly to a method for monitoring machining condition of a machine tool.

In operation of a machine tool such as a lathe, excessive wear of a cutting edge has an adverse effect on the finish of a workpiece. Hithertofore, it has been a common practice to detect such a wear by an experienced workman. However, this method requires an increased labour since there must be one workman for one machine tool in order to assure a satisfactory operation. Further, in a modern high speed machining or heavy load machining, the cutting edge is often subjected to chipping as well as a normal wear, so that it is essential to provide an experienced workman to monitor the condition of the cutting edge in order to perform an automatic operation. In a recent machine tool, it is a tendency that the machine tool is controlled in such a manner that work conditions are automatically determined so as to utilize the full capacity of the cutting edge. Further, it is an ultimate aim of the machine tool industry to provide a complete automatic operation of a machine tool. Thus, there is a need for a method of detecting an abnormal condition of a cutting edge of a machine tool.

SUMMARY OF THE INVENTION

Therefore, it is a primary object of the present invention to provide a novel method for monitoring machining condition of a machine tool.

Another object of the present invention is to provide a method for detecting an abnormal condition of a cutting edge.

A further object of the present invention is to provide a method which can effectively detect breakages of a cutting edge as well as an excessive wear thereof.

In order to achieve the above objects, according to the present invention, there is provided a method for monitoring machining condition of a machine tool which includes a work holder for holding a workpiece and a cutting tool which is adapted to be brought into cutting engagement with said workpiece, said method comprising steps of measuring a backing force component, a feeding force component and a main force component acting on the cutting tool, calculating ratios of respective two force components to the other force component, and comparing the ratios with corresponding reference values to detect abnormal conditions during cutting operation. When it is found that at least one of the ratios exceeds the corresponding reference value, a signal is produced to stop the operation of the machine tool. According to a preferred mode of the present invention, the ratios of the backing force component and the feeding force component to the main force component are calculated. The ratios are found to be very effective to find several discrepancies in the cutting edge of the cutting tool.

The above and other objects and features of the present invention will become apparent from the following descriptions of a preferred embodiment taking reference to the accompanying drawings.

DESCRIPTION OF THE PREFERRED EMBODIMENT

Figure 1:
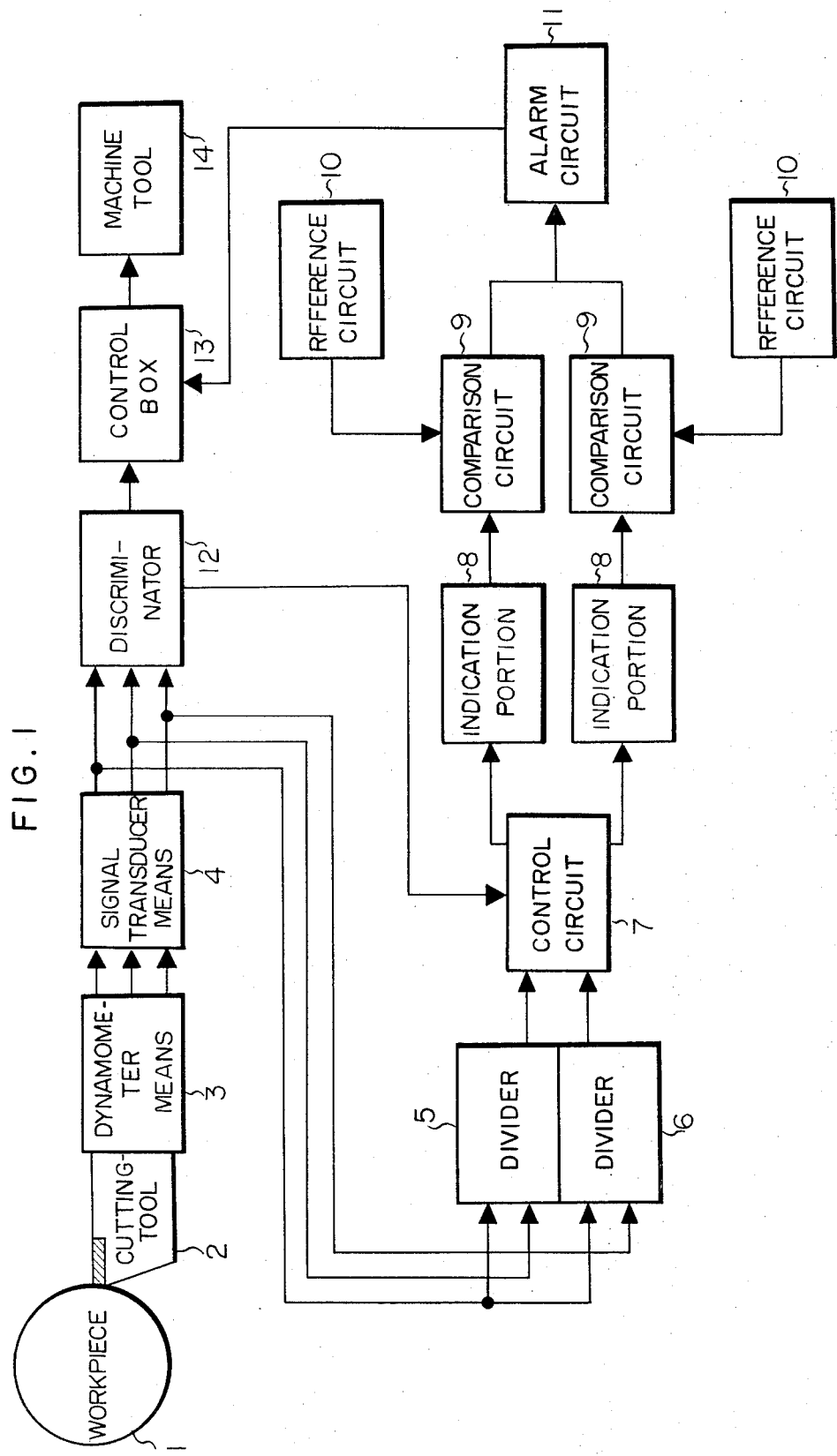
FIG. 1 is a block diagram of an embodiment of the present invention.

Referring to the drawings, particularly to FIG. 1, the reference numeral (1) designates a workpiece held on a lathe and adapted to be machined by a cutting tool shown by the reference numeral (2). The cutting tool (2) is combined with dynamometer means (3) which comprises dynamometers arranged so as to detect three force components on the cutting tool. The reference numeral (4) designates signal transducer means for transducing the signals from the dynamometer means (3) into electrical signals representing a backing force component $Fn$, a feeding force component $Ft$ and a main force component $Fc$. The reference numerals (5) and (6) designate operation amplifiers which receive the output signals of the transducer means (4) and respectively calculates the ratios $Ft/Fc$ and $Fn/Fc$. It has been found that the component $Fc$ is less affected by abnormal conditions of the cutting edge of the tool (2), while the components $Ft$ and $Fn$ are largely affected by them, so that the ratios are very effective to detect the abnormal conditions of the cutting edge. The calculate ratios $Ft/Fc$ and $Fn/Fc$ are then introduced into a control circuit (7). The reference numeral (12) designates a load descriminating circuit which receives the signals representing the force components $Fc$, $Ft$ and $Fn$ from the transducer (4) and descriminates each inputs for example into three stages, that is, under 10 Kg, between 10 Kg and the maximum allowable for each force component and over the maximum allowable value. If it is found that either of the inputs show a value exceeding the maximum allowable value, the descriminator (12) sends a signal to a control box (13) for a machine tool (14) so as to stop the operation of the machine tool (14). When the input signal is below the maximum allowable value, the output of the descriminator (12) is introduced into the control circuit (7).

The control circuit 7 is a gate circuit which operates to block the ratios $Ft/Fc$ and $Fn/Fc$ when the input from the discriminating circuit (12) indicates that the cutting force component is below 10 kg, and to allow the ratios $Ft/Fc$ and $Fn/Fc$ to pass when the force component is between 10 kg and the maximum value.

The control circuit (7) is controlled in accordance with the output of the descriminating circuit (12). When the value of a force component is below 10 Kg, the control circuit (7) blocks the corresponding ratio signal $Ft/Fc$ or $Fn/Fc$ to prevent it from passing therethrough, while when the value is between 10 kg and the maximum allowable value, the control circuit (7) allows the corresponding ratio signals to pass therethrough into corresponding one of indicating sections (8). The indicating sections (8) serve to convert the respective input signals $Ft/Fc$ and $Fn/Fc$ into digital values through A–D conversion and indicate the values on a panel (not shown in the drawing). The reference numeral (9) designates comparing circuits for comparing the ratio signals with corresponding reference values determined by reference circuits (10) in accordance with material of the workpiece or other factors. When either or both of the ratios of the force components exceeds the respective reference values, a signal is introduced into an alarm circuit (11) so as to make the circuit to produce an alarm signal which is then introduced into the control box (13) to stop the operation of the machine tool (14).

In a machine tool constructed as described above, if the cutting edge of the cutting tool (2) is broken due to an external vibration or the like during a rough machining operation of the workpiece (1), the breakage is detected by the dynamometers of the dynamometer means (3). In this instance, the main force component ($Fc$) receives little influence, however, there are produced remarkable changes in the force components $Fn$ and/or $Ft$, so that either or both of the ratios $Ft/Fc$ and $Fn/Fc$ are changed. Thus, the breakage of the cutting edge can be detected. For example, if the force component $Ft$ is 15 Kg, a corresponding signal is introduced from the load descriminating circuit (12) to the control circuit (7), and the ratio $Ft/Fc$ is designated in the indicating section (8). If the reference value determined by the circuit (10) is 0.6 and the actual ratio $Ft/Fc$ is 0.7, a signal is sent from the circuit (9) to the alarm circuit (11) which then sends a signal to the control box (13) to stop the machining operation of the machine tool (14).

Figure 2:
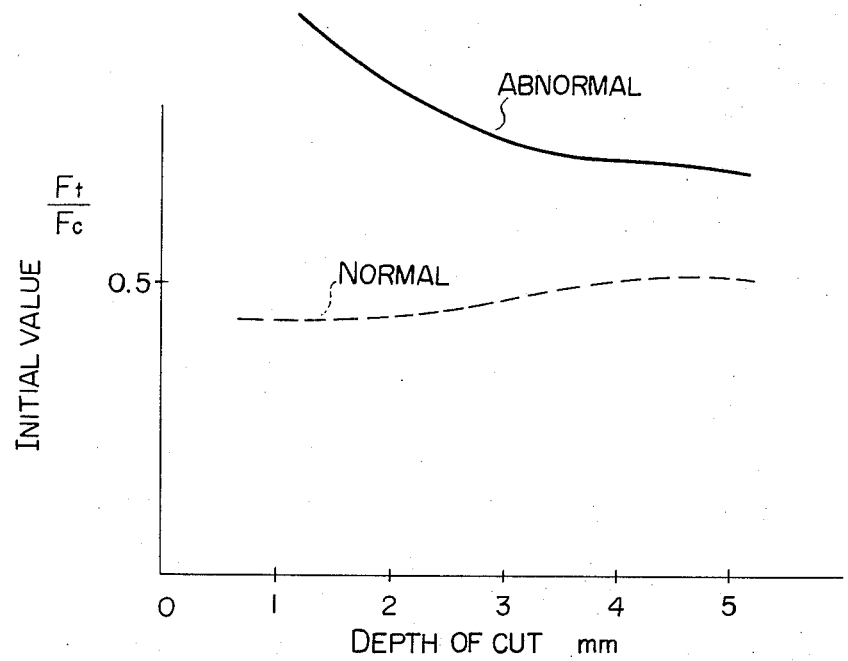
FIGS. 2 through 8 are diagrams showing experimental results.
Figure 3:
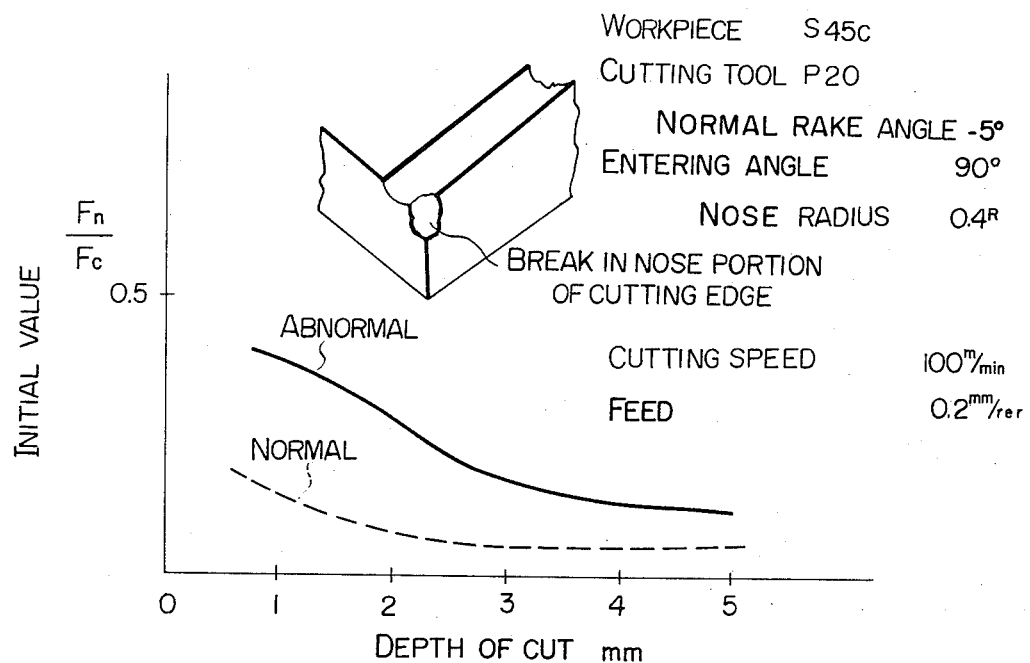
Figure 4:
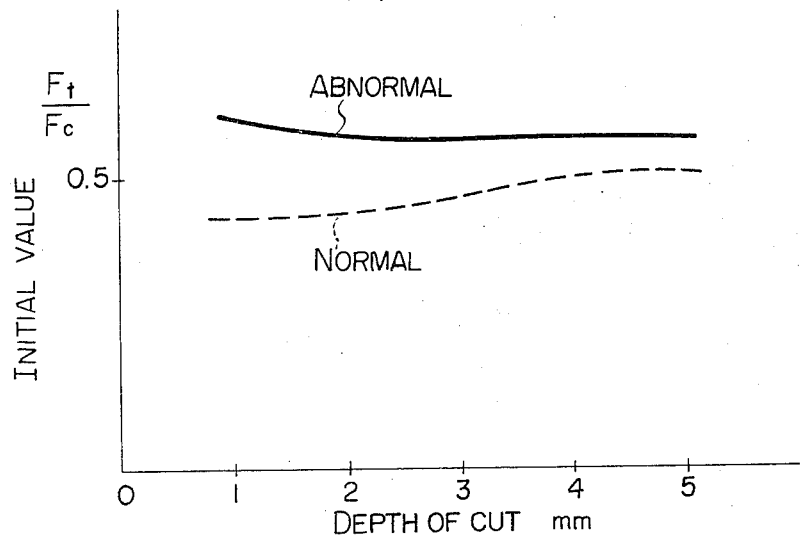
Figure 5:
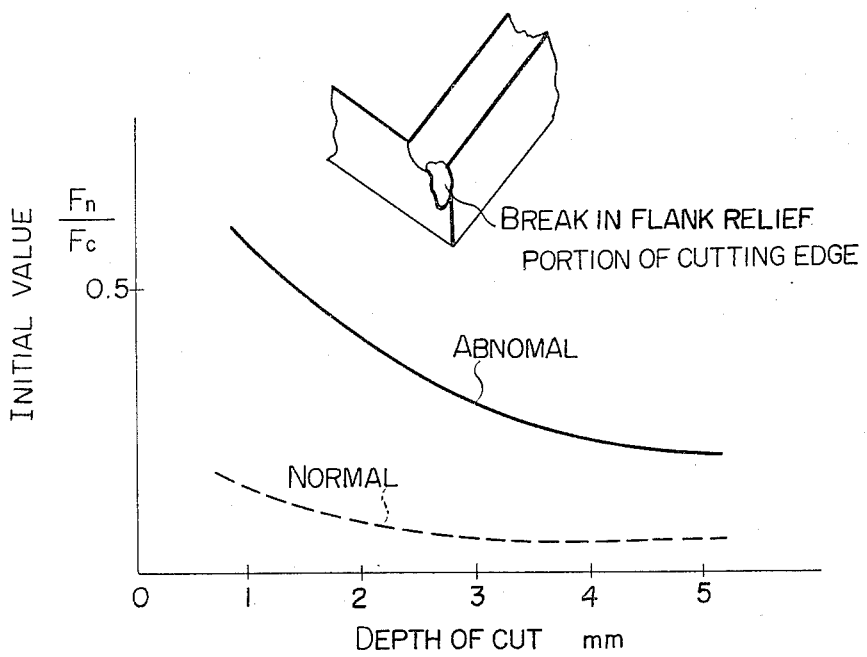
Figure 6:
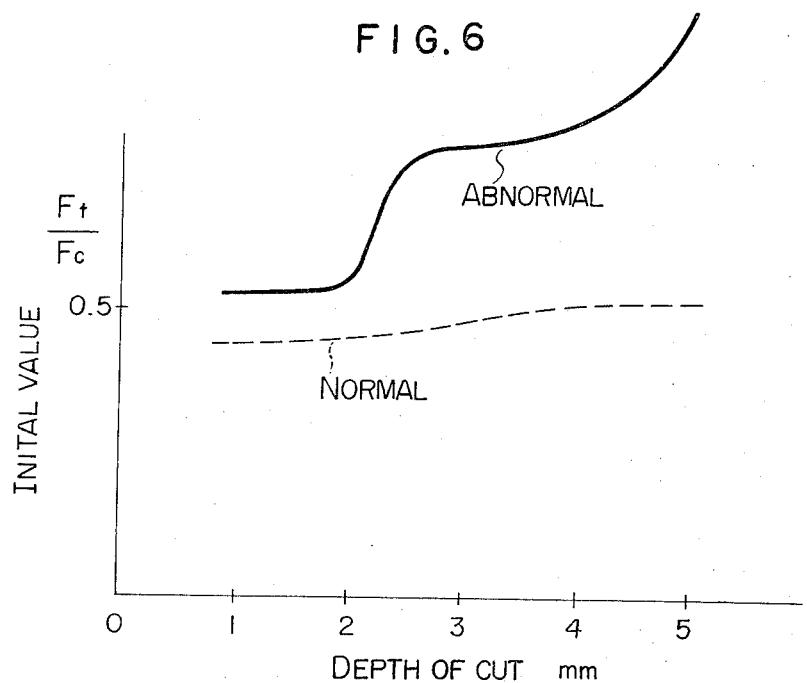
Figure 7:
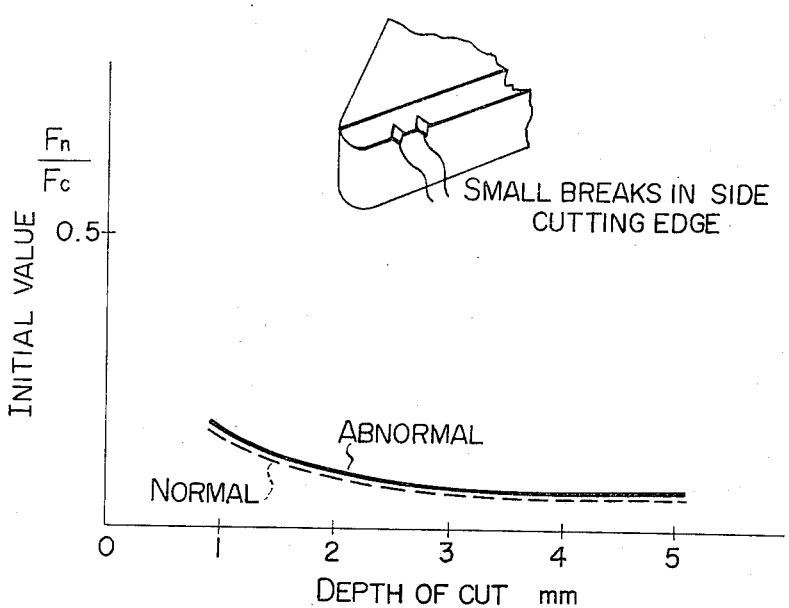

Referring now to FIGS. 2 through 7, FIGS. 2, 4 and 6 show the ratio $Ft/Fc$ with reference to the cutting depth and FIGS. 3, 5 and 7 show the ratio $Fn/Fc$ with reference to the cutting depth. FIGS. 2 and 3 show changes of the respective ratios in accordance with the change in cutting depth measured on a cutting tool having a tip of standard P20 and nose radius of 0.4R, and a workpiece made of a carbon steel S45C (Japanese Industrial Standard), the cutting operation being performed with a normal rake angle of minus 5°, entering angle of 90°, cutting speed of 100 m/min, and feed speed of 0.2 mm/rev. It should be noted from FIGS. 2 and 3 that there are remarkable changes in the ratios between the normal condition and an abnormal condition in which the nose portion of the cutting edge is broken.

Figure 8:
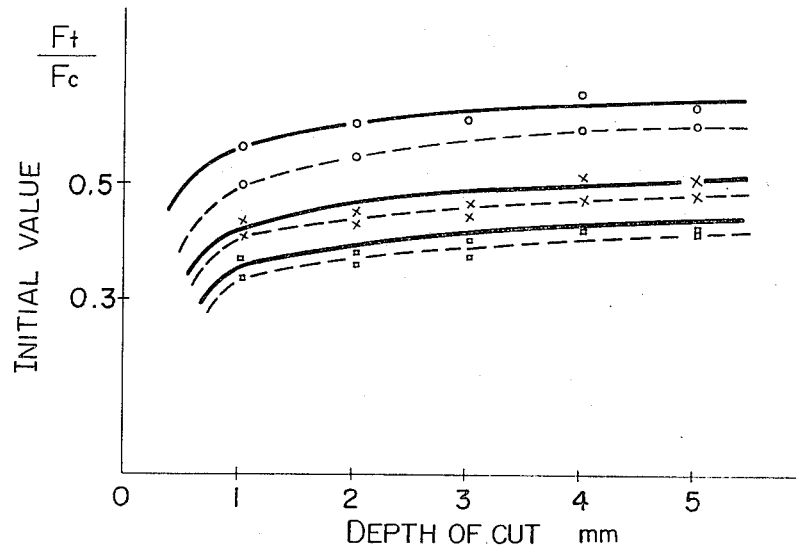

Therefore, by suitably determining reference values for the ratios, it is possible to detect abnormal conditions of the cutting edge and produce a signal in the alarm circuit (11) for stopping the machine tool (14) through the control box (13) as shown in FIG. 8, the ratio $Ft/Fc$ is reduced as the cutting depth is increased so that, in a rough machining in which the rate of feed is relatively large, it is preferable to determine the reference value to a relatively low value and, in a finish machining, to increase the reference value by 40 to 50 percent of that in the rough machining.

FIGS. 4 and 5 show results obtained by an experiment performed under the same condition as those of FIGS. 2 and 3 except that the abnormal condition was measured with a cutting tool broken at the flank relief surface of the cutting edge. In these drawings, it will be seen that the ratio $Fn/Fc$ is more remarkably changed as compared with the ratio $Ft/Fc$. Thus, it is recommandable to detect the breakage in the flank relief of a cutting edge by measuring the ratio $Fn/Fc$.

FIGS. 6 and 7 show results of an experiment performed under the same conditions as in the preceding experiments except that the abnormal condition is measured with a cutting tool having breakages in the side cutting edge thereof. From these drawings, it will be seen that there is no remarkable change in the ratio $Fn/Fc$ between the normal condition and the abnormal condition but the ratio $Ft/Fc$ changes remarkably, particularly in the range of high cutting depth between the normal and abnormal conditions. Thus, the breakage in the side cutting edge of the tool can be detected by the ratio $Ft/Fc$. It has been found through the experiments that there is no remarkable change in the ratios in response to the change in the nose radius and the cutting speed.

From the above description, it will be noted that the present invention is effective to moniter the machining conditions of a machine tool. Particularly, the reaction force acting on the cutting tool is measured in terms of three force components, that is, a backing force component, a feeding force component and a main force component, and ratios of two force components to the other component are calculated for comparison with reference values. Since the ratios of two relatively variable force components to a relatively stable force component are obtained, any change in the condition of the cutting edge can be positively detected. The employment of such ratios is a advantageous in that the ratios are not affected by external disturbances.

Although the invention has thus been shown and described with reference to a preferred embodiment, it should be noted that the invention is in no way limited to the details of the illustrated embodiment but many changes and modifications can be made without departing from the scope of the appended claims.

I claim:

1. A method of monitoring machining condition of a machining tool having a work holder for holding a workpiece and a cutting tool which is adapted to be brought into cutting engagement with said workpiece, said method comprising steps of measuring a backing force component, a feeding force component and a main force component acting on the cutting tool, calculating ratios of two force components to the other force component, and comparing the ratios with corresponding reference values to detect abnormal conditions during cutting operation.

2. A method in accordance with claim 1 in which said reference values are fixed values determined by reference circuit means.

3. A method in accordance with claim 1 in which the ratios of the backing force component and the feeding force component to the main force component are calculated.

4. A method in accordance with claim 1 in which the operation of the machine tool is stopped when at least one of the ratio exceeds the corresponding reference value.

5. A method in accordance with claim 1 in which when at least one of the force components exceeds the maximum allowable value, the operation of the machine tool is automatically stopped.

* * * * *